United States Patent

Freeman et al.

[11] Patent Number: 5,846,309
[45] Date of Patent: Dec. 8, 1998

[54] COARSE PARTICLE SIZE KAOLIN CLAY AND METHOD

[75] Inventors: Gary M. Freeman, Macon; John M. M. Harrison, Dry Branch; Kenneth B. Files, Cochran, all of Ga.

[73] Assignee: J. M. Huber Corporation, Edison, N.J.

[21] Appl. No.: 803,349

[22] Filed: Feb. 20, 1997

[51] Int. Cl.$^6$ ...................................................... C09C 1/02
[52] U.S. Cl. ........................ 106/416; 106/468; 106/486; 523/209; 523/216; 523/220; 523/443; 523/513; 523/521; 524/427
[58] Field of Search .................................. 106/416, 468, 106/486; 523/209, 216, 220, 443, 513, 521; 524/427

[56] References Cited

U.S. PATENT DOCUMENTS

| | | | |
|---|---|---|---|
| 3,635,662 | 1/1972 | Lyons ....................................... | 106/416 |
| 4,183,843 | 1/1980 | Koenig et al. ........................... | 523/216 |
| 4,241,142 | 12/1980 | Kaliski et al. ........................... | 106/416 |
| 4,427,450 | 1/1984 | Kostansek ............................... | 106/486 |
| 5,036,118 | 7/1991 | Martinez ................................. | 523/212 |
| 5,167,707 | 12/1992 | Freeman et al. ........................ | 106/416 |
| 5,522,924 | 6/1996 | Smith et al. ............................. | 106/486 |
| 5,543,372 | 8/1996 | Shi et al. ................................. | 106/486 |
| 5,545,599 | 8/1996 | Pickering, Jr. et al. ................. | 106/416 |

FOREIGN PATENT DOCUMENTS

| | | |
|---|---|---|
| 0 031 434 | 8/1981 | European Pat. Off. . |
| 1053270 | 11/1965 | United Kingdom . |
| WO 82/03243 | 9/1982 | WIPO . |

OTHER PUBLICATIONS

Abstract of Japanese Patent No. 58025333 A Sep. 1993.
The Reinforced Plastics Handbook, John Murphy (1994) pp. 26–37 and 95–99 (no month).
Sheet Molding Compounds Science and Technology, Hanser, pp. 94–115 (no date).

Primary Examiner—Mark L. Bell
Assistant Examiner—Scott L. Hertzog
Attorney, Agent, or Firm—PepperHamilton LLP; Robert A. Koons, Jr.; Russell G. Lindenfeldar

[57] ABSTRACT

A coarse particle kaolin clay is provided having an average Stokes equivalent particle diameter of about 4.5–6.0 microns, a BET surface area of about 8–11 m$^2$/g, and preferably having a median Malvern particle size of about 9.0–10.5 microns as determined by laser light-scattering measurement and a high aspect ratio preferably of about 12–14 as determined by Sphericity Model calculations. The coarse particle kaolin clay provides low viscosity build, good reinforcement properties and excellent surface finish qualities as a filler in thermoset composite materials, such as polyester molding compounds, and also provides excellent pigmenting properties in paints and industrial coatings. Preparation of the coarse particle clay involves blunging and degritting a crude kaolin clay, conducting three separate centrifugation steps with the desired product stream being, in sequence, the coarse underflow clay from the primary centrifuge, the coarse underflow from the secondary centrifuge, and then the fine overflow from the tertiary centrifuge, followed by magnetic separation, screening, chemical leaching, drying and milling to produce a kaolin clay product having the above-described physical properties and performance characteristics.

44 Claims, 6 Drawing Sheets

COARSE PARTICLE SIZE KAOLIN CLAY AND METHOD

BACKGROUND OF THE INVENTION

1. Field of the Invention

The present invention relates to a kaolin clay and a method for its production. More particularly, the invention relates to a kaolin clay product having a very coarse particle size, a higher than expected BET surface area, a high particle aspect ratio, and a waterwash process for making the same.

2. Description of the Related Art

Kaolin clay (kaolinite) is a naturally occurring, crystalline aluminosilicate material having the chemical formula $Al_2Si_2O_5(OH)_4$ and structurally consisting of linked, alternating layers of tetrahedral silicon and octahedral aluminum. Mined crude kaolin clay is typically refined for use as fillers in rubber, plastics, and other polymers, as well as for use as pigments or pigment extenders in paints and other industrial coatings. Kaolin clay crudes are generally processed in one of two ways: 1) via an airfloat process wherein the crude clay is crushed, dried, pulverized, and then air-classified to the desired particle size and to remove unwanted impurities; or 2) via a waterwashed process wherein the crude clay is dispersed in water, degritted, fractionated and then subjected to various chemical beneficiation steps to improve its brightness properties.

Although mineral additives like kaolin clay have historically been viewed as merely low cost fillers, they are often a critical factor in the processing of polymeric composites. These processing aspects are particularly important in unsaturated polyester compounds since filler loadings are typically high (e.g., on the order of 100 phr). For example, minor variations in filler properties are well known to cause significant variations in the paste viscosity profile of thermoset compounds. Hence, the physical properties of the fillers must be maintained within certain tightly controlled limits to produce thermoset composites of consistent quality. Furthermore, having a lower viscosity clay can be important in thermoset applications in terms of improving the processability of the compound and/or for facilitating the dispersion of the clay filler. Improved filler dispersion very often results in improved physical properties for the finished plastic. In addition, lower compound viscosities provide one with the latitude to increase clay filler loadings further (to decrease compound cost and/or increase certain physicals as desired) while maintaining equal processability. Finally, mineral filler properties such as particle size and particle morphology affect the surface finish and physical properties of the polymeric composite.

Consequently, glass reinforced polyester molding compounds, automotive parts and other general hardware made in heated matched metal dies or molds could benefit greatly from a low viscosity, coarse particle size clay. Polyester molding compound is conventionally produced in the form of sheet molding compound (SMC) or bulk molding compound (BMC). SMC and BMC compounds which are formulated from polyester resins, reinforcements (typically glass) and mineral filler additives like clays, calcium carbonate or alumina trihydrate (ATH) are match metal die molded under high heat and pressure to form the plastic parts. Sheet molding compound is made by dropping glass fibers onto the surface of a polyethylene film which has first been coated with a non-polymerized polyester resin paste. Two sections of coated film are then squeezed together (coating to coating) to form a sandwich-like composite upon curing. Bulk molding compounds are similar in chemical composition to SMC compounds but the manufacturing process differs. In BMC, low intensity mixers are typically used to gently wet-out the glass fibers and mineral fillers into the resin paste for subsequent molding. A more detailed explanation of these two polyester molding processes can be found in the following reference books:

1) "Sheet Molding Compounds, Science and Technology"; edited by Hamid G. Kia, Hanser/Gardner Publications, Inc., Cincinnati, Ohio, 1993.
2) "Reinforced Plastics Handbook"; by John Murphy, Elsevier Science Publishers LTD, Oxford, U.K., 1994, pp. 26–37.

Beyond traditional SMC and BMC, other applications which could greatly benefit from low viscosity, coarse particle size clays include various specialty SMC/BMC molding compounds, pultrusion (specialty pultruded products) and CIPP (cured-in-place pipe). Good examples of where low viscosity, coarse particle clays can be used in specialty SMC/BMC compounds to good advantage include sewage treatment weirs and baffles and deck grating used in corrosive environments. In regard to low density molding compounds, this thermoset technology often involves the replacement of $CaCO_3$ with lower density fillers (like clays) to achieve low weight per volume and a Class I surface in exterior automotive body panels. In many cases, these low density compounds are molded under low pressure. Pultrusion is a molding technique that involves pulling fiberglass reinforcement through polyester resin baths filled with a coarse clay (and other ingredients) and then through heating it dries to form profiles. This is an application where coarse particle clays having low viscosity properties would provide a significant processing advantage. CIPP is a relatively new thermoset application emerging for coarse particle size clay wherein existing potable water and natural gas pipes are rehabilitated without digging by inverting an epoxy resin saturated, clay filled liner into the old pipe and then curing it with hot water or by other mechanisms. In CIPP, a low viscosity, coarse particle clay would again be very advantageous.

There are several additional advantages that a low viscosity, coarse particle size clay would provide as the principal or sole mineral additive of choice in the above mentioned thermoset applications, including: (1) pH stability or good resistance to corrosion, (2) lower specific gravity than calcium carbonate (2.6 g/ml versus 2.71 g/ml, respectively), (3) molded part surface profile or smoothness, and (4) cost/performance advantages versus ATH-only fillers. Replacing a portion of an ATH filler with a low viscosity-coarse particle size clay would reduce filler cost with a minimal increase in viscosity build, while improving the physical strength and surface properties of the thermoset material to which the filler is added.

OBJECTS OF THE INVENTION

It is accordingly an object of the present invention to provide a coarse particle size kaolin clay which simultaneously produces low viscosity build in thermoset compounds, provides good reinforcement properties, and yields excellent surface finish characteristics (i.e., a Class I surface finish) as a filler in plastic composite compositions.

A further object of the invention is to provide a unique filler package for use in thermoset composites providing a balance of performance properties that include very low viscosity build, reduced specific gravity, and flame retardancy benefits at a reasonable cost.

It is another object of the invention to provide a coarse particle size kaolin clay which has improved pigment brightness properties and imparts improved UV resistance properties versus the currently available coarse particle clays.

It is another object of the invention to provide a waterwash process for producing a coarse particle kaolin clay having the above-described characteristics.

Other objects will become apparent from the detailed description of the invention set forth below.

SUMMARY OF THE INVENTION

The kaolin clay of the invention has an average Stokes equivalent particle diameter of about 4.5–6.0 microns and a BET surface area of about 8–11 $m^2/g$. The invention preferably has a median particle size of about 9.0–10.5 microns as determined by a laser light scattering/Fraunhofer diffraction method, an aspect ratio (sphericity model) of about 12–14, a +325 mesh residue content of less than about 0.1 wt %, and an anatase $TiO_2$ content of no more than about 0.65 wt %. The invention can be used in resin composites, and is particularly effective in thermoset compositions such as unsaturated polyester and epoxy compositions. The loading (content) of the invention in thermoset materials preferably ranges from about 10–150 phr (parts, by weight, per hundred resin), and more preferably from about 50–120 phr. The invention may also be used as a pigment (including pigment extender applications) in paints and coatings.

The invention can be used alone as a filler or in combination with one or more inorganic fillers. Examples of inorganic fillers with which the invention may be combined include alumina trihydrate (ATH), calcium carbonate ($CaCO_3$), talc, mica, glass, and other clays. ATH is particularly preferred as a combination filler material, with the weight ratio of the invention to ATH preferably being about 95/5 to about 50/50, and more preferably about 95/5 to about 70/30. The ATH with which the invention is combined preferably has a BET surface area of less than 5 $m^2/g$, more preferably less than 3 $m^2/g$.

The method of the invention involves blunging and degritting a crude kaolin clay, centrifuging the partially-degritted clay to remove fine particle overflow, subjecting the once-centrifuged clay to a secondary centrifugation to remove additional fine particle overflow, subjecting the twice-centrifuged clay to a tertiary centrifugation to remove ultra-coarse particle underflow, magnetically removing impurities from the thrice-centrifuged clay, then screening, leaching, filtering, drying and milling the clay to a finished product. Particles less than 2 microns preferably comprise about 62–78% of the partially-degritted clay, about 20–35% of the once-centrifuged clay, and about 8–15% of the twice-centrifuged clay, all determined in accordance with x-ray Sedigraph particle size measurement. The thrice-centrifuged clay preferably has a median particle size of about 9.5–11.5 microns determined in accordance with laser light scattering/Fraunhofer diffraction measurement. Impurities are removed by subjecting the thrice-centrifuged clay to a magnetic field preferably having a strength of at least 2 Tesla. Screening is preferably performed using a 325 mesh or finer screen. Drying is preferably preformed by redispersing the filtered kaolin clay (acid filter cake) to form a slurry, then spray-drying the slurry.

DETAILED DESCRIPTION OF THE INVENTION

Figure 1A:
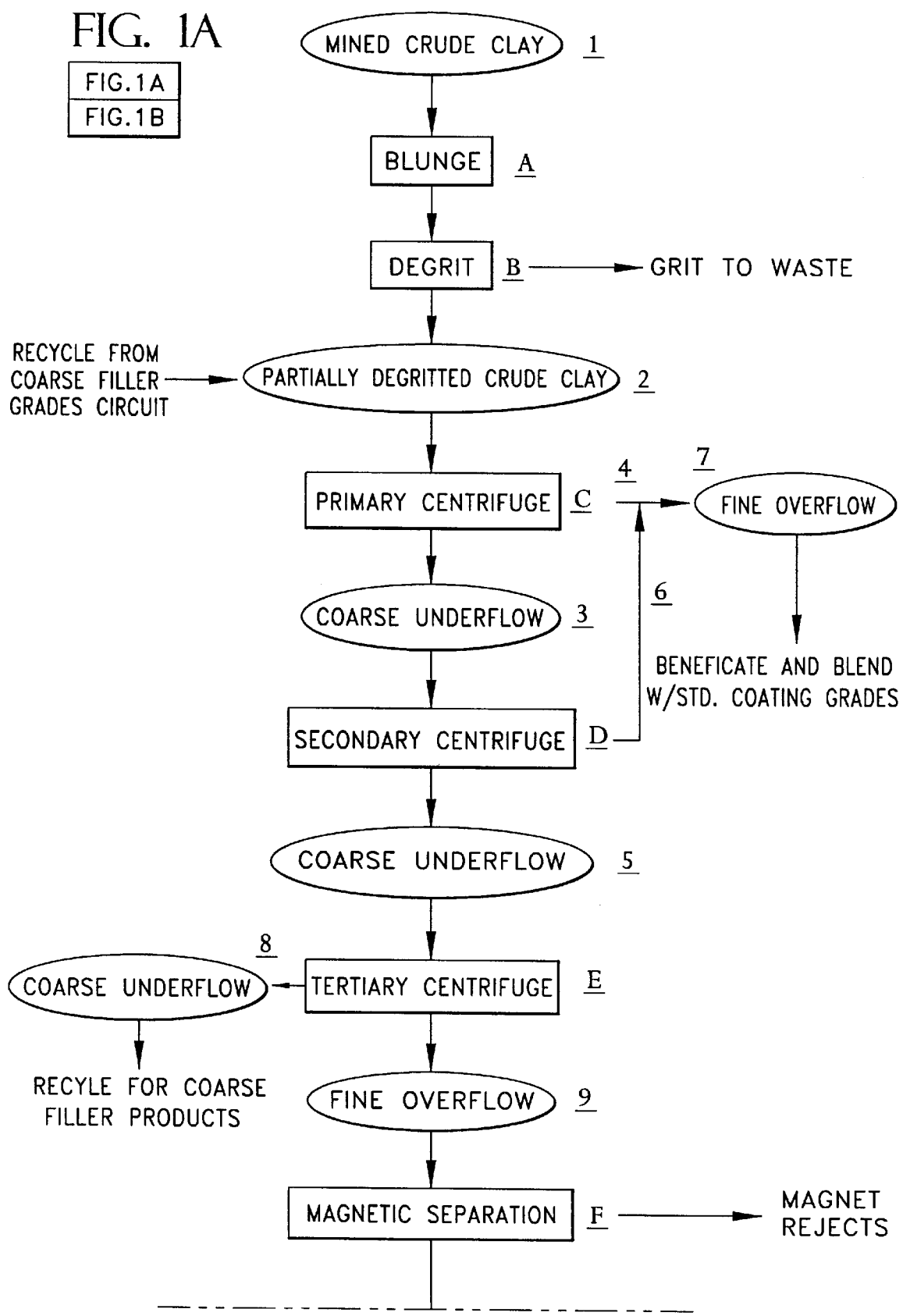
FIGS. 1A and 1B present a schematic flow diagram of a multiple centrifuge, waterwash method in accordance with the invention.

Fillers having very low surface area properties have generally been preferred for use in polyester thermosets because of the lower viscosity build normally associated with their use. Consequently, conventional coarse particle size clays like Huber 35 (manufactured by J. M. Huber Corporation) and ASP-400 (manufactured by Engelhard Corporation) have been employed in clay-filled composites because their coarse particle size translates into a product of low surface area. This common practice has arisen out of conventional thinking that polyester compound viscosity will decrease as the surface area of the kaolin clay filler is decreased. Since coarser particle size clays typically have lower BET surface areas than finer clays, they accordingly yield lower viscosity values at a given filler loading. In sharp contrast, the coarse particle clays of the present invention are unique in that they are considerably coarser in median particle size than a Huber 35 or ASP-400 (as measured by either laser light-scattering or by a x-ray Sedigraph) yet they have a BET surface area value essentially equal to or greater than these competitive clays. This seeming anomaly can be explained by the fact that the clay of the present invention has a higher particle aspect ratio than either of the current commercial clay products. The coarse particle size clay of the invention preferably has an aspect ratio of about 12:1 to 14:1, versus about 11.5:1 for Huber 35 or for ASP-400 (by Sphericity Model based calculations). For a given clay platelet diameter, the specific surface area is known to increase as clay particle aspect ratio is increased (i.e., as more thinner, clay platelets are produced). It is thus believed that the larger clay particle aspect ratio of the invention provides a higher surface area than expected from its coarser particle size.

Far more surprising than the above particle size versus surface area effects is our discovery that, despite having a BET surface area value essentially equivalent to or significantly greater than conventional coarse clays, the invention often yields significantly lower viscosities as a filler in various thermoset compositions. As previously discussed, a lower paste viscosity would not have been expected on the basis of the invention's BET surface area properties. As demonstrated below, lower compound viscosities are obtained with the invention versus a Huber 35 or an ASP-400 when they are all compared at high clay loading levels in a given polyester resin (typically at phr's of 90 and above), while essentially equivalent viscosities may be found at low loading levels. These facts strongly suggest that compound viscosity is not related to just clay filler surface area, but is likely dependent on particle shape, particle size distribution and particle packing considerations as well. Since formulators of thermoset compounds often seek to maximize filler loadings in order to extend resin and reduce costs, the performance features of the invention are very well suited to accomplishing this goal.

As demonstrated below, the viscosity performance advantages provided by the clays of the present invention are realized in a wide variety of polyester resin systems. Filler loading of the invention in thermoset materials preferably ranges from about 10–150 phr (parts per hundred resin), and more preferably from about 50–120 phr.

The invention can be used alone as a filler or in combination with one or more inorganic fillers. Examples of inorganic fillers with which the invention may be combined include alumina trihydrate (ATH), calcium carbonate ($CaCO_3$), talc, mica, glass, and other clays. ATH is particularly preferred as a combination filler material, with the weight ratio of the invention to ATH preferably being about 95/5 to about 50/50, and more preferably about 95/5 to about 70/30.

Beyond its low paste viscosity advantages, the high aspect ratio of the invention provides good reinforcement properties to plastic composites, particularly in the area of flexural strength, and can greatly improve a composite's surface finish quality. Surface finish is particularly important for thermoset composites (such as in SMC) used in automotive body panels and fascia or other aesthetically-demanding applications. For example, the dual performance benefits of using a high aspect ratio mica (a layered silicate mineral related to kaolin) in a RIM polyurethane composite are disclosed in U.S. Pat. No. 5,036,118. We have discovered that the coarse particle clay of the invention, which possesses a high aspect ratio, provides better physical reinforcement properties and improved composite surface quality than kaolin clay fillers of significantly lower aspect ratio. The invention will advantageously yield a thermoset composite having a Class I surface finish (fillers for polyester molding compounds are classified within the industry as Class I or Class II fillers depending on the surface finish they impart to the composite, with Class I being a finish of higher quality). No known coarse kaolin clay filler can provide this truly remarkable combination of low viscosity build, excellent reinforcement and high quality surface finish for polyester thermosets and other composites.

In addition to their excellent utility as fillers for thermoset composites, the coarse particle size, high aspect ratio clay of the invention functions well as a pigment for paint and coating applications. The invention advantageously provides improved UV resistance versus conventional coarse particle clay pigments used in paint and coatings applications while maintaining essentially equivalent optical, sheen and gloss properties. The ability to provide improved UV resistance is particularly advantageous for extender pigment applications in exterior paints. Conventional coarse particle clays currently used as pigment extenders in paints and industrial coatings have also been hindered by low brightness values. The clay of the present invention has improved brightness properties versus products like Huber 35 or ASP-400 that increases its utility in many paint related applications.

Another novel aspect of the present invention involves the use of a very low surface area ATH (i.e., Alumina Trihydrate) in combination with a coarse particle size clay filler for use in polyester thermoset compounds. Significant reductions in paste viscosity are generally observed for ATH additions up to a clay/ATH weight ratio of about 50/50, whereafter the relative amount of viscosity improvement gained from replacing more coarse particle clay with ATH begins to proportionally diminish. In particular, clay/ATH blend ratio combinations ranging from 95/5 to about 70/30 by weight are very useful for polyester composites, especially when employing the coarse particle clays of this invention as the clay blending component, in that the blends offer very low viscosity build and reduced specific gravity at a reasonable cost. Very low paste viscosities can be achieved with these clay/ATH blends because coarse particle ATH builds far less viscosity than the coarse particle clays. This ATH characteristic is likely the result of their very low BET surface area. In regard to achieving notable viscosity reductions, ATH addition levels of 10–20% are generally sufficient to affect a significant reduction in paste viscosity. ATH also has a lower specific gravity than kaolin clay (2.42 g/ml versus 2.6 g/ml), hence the partial replacement of clay with ATH helps to further reduce the weight of polyester composites relative to traditional calcium carbonate filled SMC or BMC compounds. ATH fillers are also known to provide desirable flame retardancy properties to composites. The total replacement of clay with ATH is however not attractive for both economic and performance reasons. ATH is considerably more expensive than clay; therefore, the use of high replacement levels will increase cost significantly. In addition, ATH fillers have less particle aspect ratio than coarse particle clays and can accordingly detract from the surface finish properties of the plastic composite relative to having used all coarse particle clay. Therefore, one must carefully balance the flame retardancy plus the viscosity reduction and specific gravity reduction benefits of ATH use against the increased cost and reduced surface finish disadvantages in a given application to achieve the best cost versus performance properties. So as to provide the lowest viscosities, the preferred ATH fillers to use with coarse particle clays are those having a BET surface area <5 $m^2/g$, but more preferably <3 $m^2/g$. A highly preferred ATH candidate for use would be J. M. Huber's SB-432 product, which is a 9 micron (Stokes equivalent diameter) dry ground ATH having a BET surface area value of about 2 $m^2/g$.

In the method of the present invention, a very coarse particle size kaolin clay is produced from a novel waterwash process involving multiple centrifuge passes that effectively remove ultrafine clay and then ultra-coarse clay plus grit from a standard clay process underflow stream. The clay produced from this new process is, of course, in accordance with the invention; i.e., the clay has an average Stokes equivalent particle diameter of about 4.5–6.0 microns, preferably about 4.8–5.5 microns, a BET surface area of about 8–11 $m^2/g$, and preferably a Malvern median particle size of about 9.0–10.5 microns which is based on a laser light-scattering method. By either particle size methodology, the clays of this invention are significantly coarser in particle size than the currently available coarse particle, waterwashed clays like Huber 35 or ASP-400. The multiple (3 pass) centrifugation process described herein is not only important in terms of producing a coarse particle clay of high aspect ratio, but in producing one that is very consistent in terms of its range of particle size and surface area properties. As a result, the coarse particle clays of this invention preferably have a particle aspect ratio of about 12–14 (by Sphericity Model), while in addition they preferably have a +325 mesh residue content of less than about 0.1% by weight, and preferably have an "iron stained" anatase $TiO_2$ content of no more than about 0.65% by weight. The latter two properties are particularly important with respect to the coarse particle clay's utility as an extender pigment for paint and industrial coatings, since high +325 mesh residue levels tend to negatively impact Hegman grind properties while high "iron stained" anatase $TiO_2$ contents are generally associated with clays having lower brightness properties. Although using a high speed centrifuge on kaolin clay feeds to produce a desired particle size cut is well known processing art, the multiple (3 pass)

centrifugation process used herein to produce the desired coarse particle clays of this invention is unique. One of the novel aspects of this three step centrifugation process is that the control on the secondary centrifuge is based on directly controlling the particle size of the clay underflow stream (not the overflow) so that the secondary underflow product is carefully controlled to provide an x-ray Sedigraph particle size including only 8–55 wt % <2 microns. Conventional practice in the kaolin clay mining and processing industry is to run the high speed centrifuges so as to control the particle size of the overflow clay products since the fine particle clays are generally viewed as the high-value products as targeted for the paper industry. It should also be noted here that it is highly desirable in the second centrifugation step, that is designed to remove additional fines from the primary underflow product, that a fine particle clay fraction be generated which can subsequently be reclaimed for use in various fine particle coating clays. This strategy thereby helps to increase the overall yield of clay products obtained from a given mined crude clay. Clipping out a sufficient amount of fine clay particles in the secondary centrifuge step and then removing the ultra-coarse tail from the clay's particle size distribution in the third centrifugation step are important elements of the invention.

In addition to using multiple centrifuge passes, other mineral processing steps are utilized to produce the final coarse particle clay product. After centrifugation, these additional processing steps include magnetic separation for removal of colored magnetic impurities, mechanical screening to remove +325 mesh grit and coarse mica content, chemical leaching with sodium dithionite at low pH for improving clay brightness, dewatering via rotary vacuum filtration, redispersion of the clay filter cake at about pH 6.5 via the use of soda ash and an anionic dispersant like sodium polyacrylate, spray-drying the dispersed filter cake product and then milling the dry product into a finely pulverized powder. Alternatively, the acid filter cake product obtained off the rotary vacuum filter can be dried directly via a tunnel drier, a flash drier or the like for feeding a grinding mill to yield the pulverized dry product in acid dried form. In either' case, the clay milling step is conducted to deagglomerate the coarse particle clay product which can be accomplished through the use of conventional hammer mills, impact mills, jet mills or the like. It should also be noted that conventional magnetic separation and chemical leaching steps have been used to produce a finished coarse particle clay product of higher pigment brightness (on the order of about 3 points) over current products like ASP-400. Improved pigment brightness can be of added value in various paint and industrial coating applications.

It should also be noted that coarse particle clays having a median particle size larger or smaller than those of the present invention can be produced by the waterwash process described herein; however, such clay products have several performance drawbacks. Paste viscosity studies on various polyester compounds indicate that coarse particle clays having an average Stokes equivalent particle diameter of 4.5–6.0 microns generally provide the lowest viscosity build. Clays outside this particle size range (finer or coarser) were found to yield higher compound viscosities when used at high filler loadings. In addition, it becomes increasingly more difficult to produce coarse particle clay products of low +325 mesh residue content (i.e., <0.1% by wt.) when exceeding an average Stokes equivalent particle diameter of about 6.0 microns. Having a coarse particle clay with a low residue content is not so critical for polyester thermoset applications, but this can be extremely important in pigment related applications such as in paints and industrial coatings because of Hegman Grind. In particular, the coarse particle clay of this invention has very good utility as a pigment extender in flat, exterior latex paints.

Figure 1B:
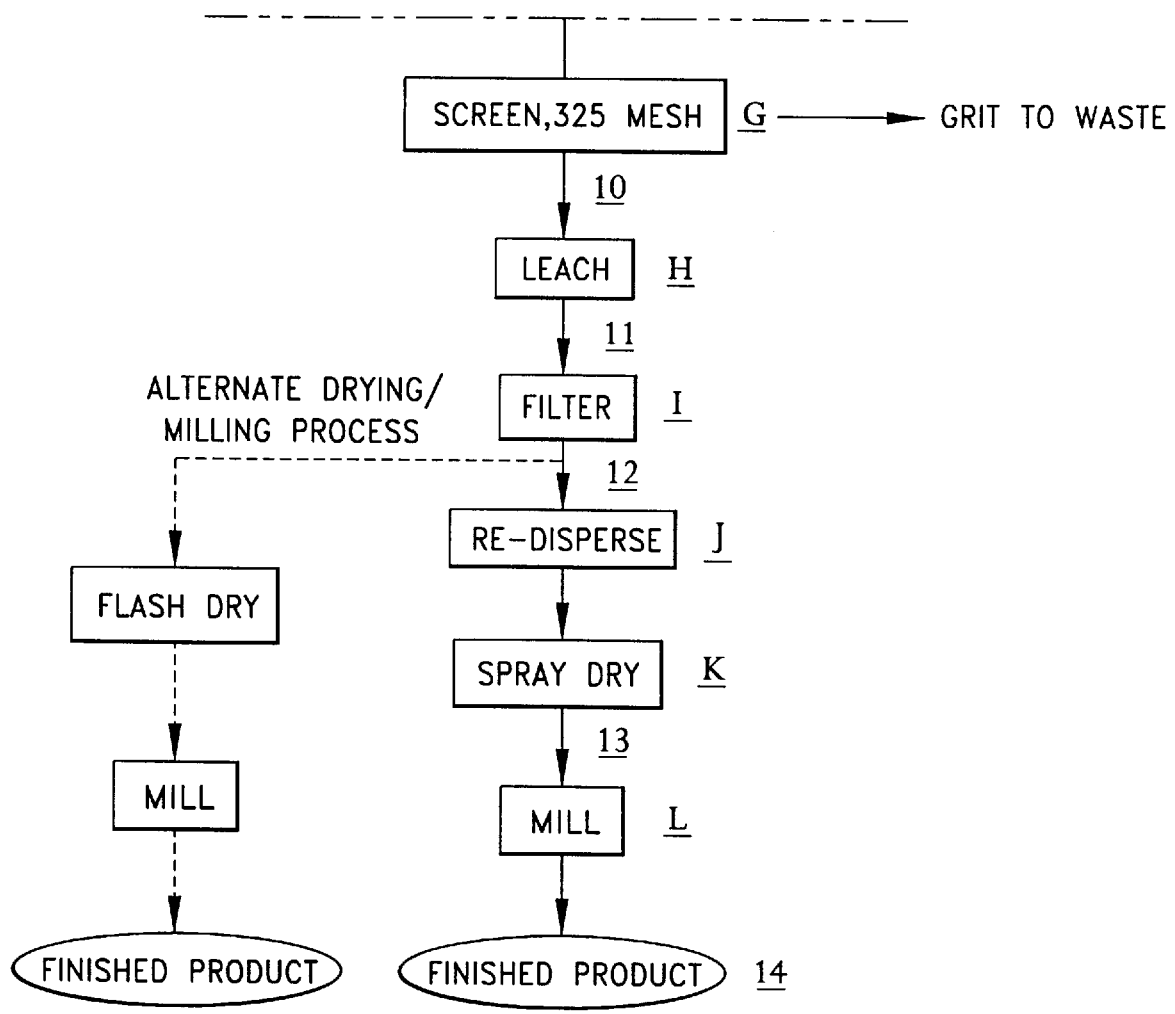

A coarse particle kaolin clay in accordance with the present invention can be produced in accordance with the kaolin clay processing scheme outlined in FIGS. 1A and 1B. In this processing scheme a mined crude clay having a preferable solids content of 78–82%, preferably of sedimentary origin and more preferably derived from a middle Georgia Cretaceous kaolin clay crude, is blunged under high shear into a crude slurry of 40–55% solids content using 6–10 ppt (pounds per ton of dry clay) of an anionic, inorganic dispersant such as a liquid sodium silicate reagent. Preferably, a liquid sodium silicate having an active reagent content of 37.6% and a $SiO_2/Na_2O$ weight ratio of about 3.22 is used, such as "N" sodium silicate as produced by the PQ Corporation—Philadelphia, Pa. The coarse particle sand and other mineral impurities are then removed from this crude clay slurry by using a drag box (or through another equivalent separation method such as screening) to generate a partially degritted crude clay which is then fed to a high speed centrifuge. A typical partially degritted clay crude produced during the method of the invention has a brightness of about 80% and an x-ray Sedigraph particle size of about 62–78 wt % <2 microns. The partially degritted crude clay of 38–44% solids would then be fractionated via the high speed centrifuge into coarse underflow and fine overflow streams. In conventional kaolin processing methods, the primary centrifuge conditions (which include well known parameters such as % solids, throughput rate and number of G's) are typically controlled so as to obtain a particular fine overflow clay product of controlled particle size (such as a #1 or #2 type coating clay) and the underflow becomes a by-product process stream. Conversely, in the method of the invention, the coarse underflow clay produced by the primary centrifuge step represents the product process stream, while the fine overflow clay represents a by-product process stream. The primary centrifuge step of the invention yields a coarse particle size clay product having a preferred x-ray Sedigraph particle size of about 20–35 wt % <2 microns.

In the present invention, the coarse underflow clay produced from the primary centrifuge step (product 3 of FIG. 1A) is then utilized as the feed material for a second centrifugation step designed to remove additional clay fines. The second centrifuge step is controlled on the basis of the underflow product being produced rather than the overflow product. On that basis, it is preferred that a coarse underflow clay having an x-ray Sedigraph particle size of about 8–15 wt % <2 microns be produced from the second centrifugation step. Furthermore, the overflow clay by-product generated from this secondary centrifuge step can be recovered and subsequently combined with other like overflow products in order to maintain high overall plant yields, which is important in keeping overall processing costs low. Many overflow by-product clays can be processed into high-margin coatings clays which is good for overall plant profitability.

The coarse underflow clay produced from the secondary centrifuge step (product 5 of FIG. 1A) is then centrifuged a third time in order to remove additional +325 mesh grit as well as extremely coarse clay and micaceous particles. The third centrifugation process also preferably differs from the first two in that the overflow clay product is controlled on the basis of its Malvern median particle size rather than by the wt % of particles <2 microns as measured by x-ray Sedigraph. The preferred Malvern median particle size of this overflow clay (product 9 of FIG. 1A) is about 9.5–11.5 microns. It is also preferable that the third centrifugation step be conducted such that the +325 mesh residue content of the overflow clay be reduced below about 1.0 wt %, and more preferably below about 0.5 wt %. Higher residue levels can often inhibit the efficiency and/or effectiveness of the subsequent magnetic separation and product screening steps shown in FIGS. 1A and 1B.

Magnetic separation and screening are conducted after the third centrifugation step, and may be performed in accordance with conventional methods. However, in order to achieve the desired final brightness and residue properties, the thrice-centrifuged clay is preferably subjected to magnetic field strengths of at least 2 Tesla and subsequently screened using Derrick type screens of 325 mesh or finer.

After magnetic separation and screening, the clay process stream of about 25–29% solids content is chemically leached and filtered. Brightness and +325 mesh residue properties prior to leaching and filtering are preferably about 81% and about 0.03 wt %, respectively, while the Malvern median particle size range of the clay is preferably reduced from about 9.5–11.5 microns down to about 9.0–10.5 microns. The clay leaching process may be conventionally conducted at low pH and at elevated temperatures by adding alum (aluminum sulfate) at about 9–13 ppt and sodium dithionite at about 0.5–2.0 ppt. After leaching, the preferred product brightness value is about 83.5%.

An acid filter cake product of about 56–64% solids (product 12 of FIG. 1B) may then obtained after the leaching step by standard rotary vacuum filtration. This acid filter cake clay product is redispersed at essentially neutral pH using a combination of $Na_2CO_3$ (at 3–6 ppt) and a sodium polyacrylate dispersant (at 2–4 ppt) to yield a clay slurry product which is suitable for spray-drying. Spray-drying of this slurry may be carried out under typical commercial drying conditions, wherein inlet air temperatures between about 400°–650° C. are routinely employed, so as to yield a dry clay product having a moisture content of less than about 1.0 wt %. The dry clay is then subsequently milled to deagglomerate the dry clay, preferably into a finely-divided powder. As an alternative to spray drying, the above acid filter cake product (product 12) can be dried directly through the use of a flash drier, tunnel drier or similar drying device and then post-milled into a finished product having a pH of about 4 as opposed to having an essentially neutral pH. The final pH value (about pH 4 versus about pH 7) preferred for the coarse particle size clays of this invention will largely depend on the end-use application being targeted for them. In either case, the clay milling step can be readily accomplished through the use of conventional hammer mills, impact mills, jet mills or the like. In accordance with FIG. 1A and 1B, Tables 1-A and 1-B shown below provide additional preferred processing details and summarize the preferred properties for the various clay product intermediates associated with the method of the invention.

TABLE 1-A

Preferred Processing Parameters Used in the Method of the Invention

| Product Stream No. # or Process Step (FIG. 1) | Intermediate Product Description or Process Step | Approx. Product Solids, Wt % | Processing Chemical Used & Typical Dosage Level, ppt* |
|---|---|---|---|
| 1 | Mined Crude Clay - typically of Cretaceous Origin | 78–82 | |
| A | Blunged Crude Clay | 40–55 | Sodium Silicate Dispersant ("N" - PQ Corp.) @ about 6–10 ppt |
| 2 | Partially Degritted Crude | 38–44 | |
| 3 | Primary Centrifuge - Underflow Clay | 35–38 | |
| 4 | Primary Centrifuge - Overflow Clay | 28–32 | |
| 5 | Secondary Centrifuge - Underflow Clay | 35–38 | |
| 6 | Secondary Centrifuge - Overflow Clay | 28–32 | |
| 9 | Tertiary Centrifuge - Overflow Clay | 26–30 | |
| 10 | Product after Magnetic Sep. and Screening | 25–29 | |
| H | Leaching Process | 25–29 | Alum @ about 9–13 ppt plus Sodium Dithionite @ about 0.5–2 ppt |
| 12 | Product after Leach and Filtering | 56–64 | |
| J | Re-Dispersion of Acid Filter Cake Clay | 56–64 | Sodium Carbonate @ about 3–6 ppt plus Sodium Polyacrylate Dispersant @ about 2–4 ppt |
| 13 | Spray-Dried Product | 99–99.5 | |
| 14 | Finished Milled Product | 99–99.5 | |

Note: *ppt units = lb./ton; pounds of process chemical added (on as received basis) per ton of clay (on dry basis).

TABLE 1-B

Preferred Properties Obtained During the Method of the Invention

| Process Stream No. # (FIG. 1) | Intermediate Product Description | Preferred Grit Content, wt % + 325 mesh | Preferred Brightness*, % | Preferred Malvern Median P.S. Range, microns | Preferred X-ray Sedigraph Particle Size, wt % < 2 microns |
|---|---|---|---|---|---|
| 1 | Mined Crude Clay - typically of Cretaceous Origin | | about 78 | | |
| 2 | Partially Degritted Crude | | about 80 | | about 62–78 |
| 3 | Primary Centrifuge - Underflow Clay | | | | about 20–35 |
| 5 | Secondary Centrifuge - Underflow Clay | | | | about 8 . 15 |
| 6 | Secondary Centrifuge - Overflow Clay | | | | about 50–80 |
| 9 | Tertiary Centrifuge - Overflow Clay | about 0.4 | about 77 | about 9.5–11.5 | |
| 10 | Product after Magnetic Sep. and Screening | about 0.03 | about 81 | about 9.0–10.5 | |
| 12 | Product after Leach and Filtering | | about 82.5–84.5 | | |
| 14 | Finished Product (after Drying and Post-Milling) | about 0.03 | about 82.5–84.5 | about 9.0–10.5 | |

The physical and chemical data reported herein were determined as follows. Color was determined on the basis of visual observation. Specific gravities were determined by means of a 25 ml pycnometer employing aqueous slurries of the clays. The moisture content on each clay in wt % was determined by drying test samples in a forced air oven at 105 deg. C. for approximately 2 hours in accordance with the TAPPI Method T671 cm-85 procedure. Clay pH values were determined using a standard pH meter on a 28% solids (by weight) mixture of the clay with deionized water in accordance with the ASTM D-1208, E-70 procedure. The % brightness values are standard TAPPI brightness numbers as determined with a Technidyne Micro TB-1C brightness meter in accordance with the TAPPI Method T646 om-86 procedure. All x-ray Sedigraph particle size measurements, whether determining the wt % of particles <2 microns or determining the average Stokes equivalent particle diameter in microns, were made via an x-ray sedimentation method based on Stokes Law using a Micromeritics 5100 Sedigraph unit. The average Stokes equivalent particle diameter is the median particle size value determined by the x-ray Sedigraph. The Malvern median particle size values, reported in microns, were measured with Malvern's Mastersizer/E unit which is based on a laser light scattering/Fraunhofer diffraction method as generally described in U.S. Pat. No. 5,167,707, incorporated herein by reference, and references cited therein. Particle Aspect Ratios were calculated by the Sphericity Model from experimentally determined surface area data as also previously described in U.S. Pat. No. 5,167,707 and references cited therein. BET surface areas were determined by the nitrogen absorption method described by Brunauer, Emett, and Teller in the "Journal of the American Chemical Society," Volume 60, page 309, published in 1938. A multi-point surface area determination was made on the clay test samples after outgassing them at 130 deg. C. using a Micromeritics Gemini III 2375 unit. The chemical analysis data for Ti, Fe, Al, Si and Na content were all determined by x-ray fluorescence analysis using a Philips PW 1404/00 Model XRF unit in which the results were expressed in terms of their corresponding oxides in weight %.

The present invention is further illustrated by the following examples, which should be regarded as demonstrating only some of the preferred embodiments and not limiting thereof.

EXAMPLE 1

A coarse particle kaolin clay in accordance with the present invention (Clay X-T) was produced by means of the clay processing scheme outlined in FIG. 1. Specifically, a mined crude clay having a solids content of 80% and a brightness of 78.5%, derived from a middle Georgia Cretaceous kaolin clay crude, was blunged under high shear mixing into a crude clay slurry of 48% solids content using 8 ppt (pounds on as received basis per ton of dry clay) of "N" sodium silicate reagent as a dispersant. "N" is a liquid sodium silicate produced by the PQ Corporation having an active reagent content of 37.6% and a $SiO_2/Na_2O$ weight ratio of about 3.22. The coarse particle sand and other mineral impurities were then removed from this crude clay slurry by using a drag box to generate a partially degritted crude clay of 40% solids which was then subsequently fed to a high speed centrifuge for fractionation into coarse underflow and fine overflow clay streams. The degritted clay crude feed had a brightness of 80% and an x-ray Sedigraph particle size of 68 wt % <2 microns. The coarse underflow clay produced from this degritted clay crude by the primary centrifuge had an x-ray Sedigraph particle size of 30 wt % <2 microns, while the corresponding overflow fraction had an x-ray Sedigraph particle size of 85 wt % <2 microns.

The coarse underflow clay produced from the primary centrifuge step was then subjected to a second centrifugation wherein a very coarse particle clay having an x-ray Sedigraph particle size of 13 wt % <2 microns was collected from the new underflow stream. The coarse underflow clay produced from the secondary centrifuge step was then centrifuged a third time in order to remove +325 mesh grit as well as extremely coarse clay and micaceous particles. An overflow clay stream of 28% solids was thus produced from this third centrifuge step, which was controlled so as to provide a clay product having a Malvern median particle size of 11.1 microns and a +325 mesh residue content of 0.41 wt %. The brightness of this coarse particle clay product was 77.0%.

After subjecting the overflow clay to conventional magnetic separation followed by screening through a stacked array of 350 mesh then 370 mesh Derrick screens, a clay product stream of 26% solids content was obtained that exhibited a Malvern median particle size of 10.1 microns. At this point in the waterwash process, the brightness and +325 mesh residue content of the coarse particle clay product had been improved to 81.0% and 0.03 wt %, respectively. Clay product brightness was then further improved to 83.5% by a leaching process, which was conducted at a pH of 4.0 and at a temperature of 55 deg. C. by adding 10 ppt of alum (aluminum sulfate) and 2.0 ppt of sodium dithionite. An acid filter cake product of 60% solids was obtained after the leaching step by using a rotary vacuum filtration. This acid filter cake clay product was then redispersed at essentially neutral pH using a combination of $Na_2CO_3$ (at 4.5 ppt) and a sodium polyacrylate dispersant (at 3 ppt) to yield a dispersed clay slurry suitable for spray-drying. Spray-drying of this slurry was carried out under typical commercial drying conditions to yield a dry clay product having a moisture content of 0.6 wt %. The dry clay was then subsequently imp milled into a finely divided powder to produce the finished product Clay X-T.

The physical and compositional properties of Clay X-T as produced by the process described above are summarized in Table 1-C. Physical and compositional properties within the scope of the invention are summarized as "Clay X-R", and properties of two comparative coarse particle clays are likewise summarized in Table 1-C. The competitive clays evaluated were Huber 35 (manufactured by J. M. Huber Corporation—Macon, GA) and ASP-400 (an acid dried clay manufactured by Engelhard Corporation). Examination of Table 1-C indicates some significant differences among the three coarse particle size clays. Most obvious, Clay X-T is significantly coarser in particle size than either ASP-400 or Huber 35, whether comparing average Stokes equivalent particle diameters (as measured by x-ray Sedigraph) or comparing Malvern median particle size values. The average Stokes equivalent particle diameter of Clay X-T is 5.25 microns as compared to 4.35 microns for ASP-400 and 4.03 microns for Huber 35. On the basis of Malvern laser light-scattering analysis, Clay X-T has median particle size of 10.0 microns as compared to 8.7 and 7.8 microns for the two competitive clays. Clay X-T is also unique in that it is considerably coarser in particle size than ASP-400, while still having a higher BET surface area value. This feature can be explained by the fact that Clay X-T has a higher particle aspect ratio than ASP-400 (13.1:1 versus 11.4:1, as determined by Sphericity Model calculations). Similar arguments can be made when comparing Clay X-T to Huber 35.

Another distinct advantage provided by Clay X-T versus ASP-400 is improved pigment brightness. Clay X-T provides a brightness advantage on the order of 3 points relative to ASP-400, which can largely be attributed to the significantly lower, natural "iron stained" anatase $TiO_2$ content in Clay X-T. The total $TiO_2$ content in Clay X-T is 0.55% by weight as compared to a value of 1.38% in ASP-400.

TABLE 1-C

Physical and Chemical Properties for Coarse Particle Clays

| Physical Properties: | ASP-400 (Comparative Example) | Huber-35 (Comparative Example) | Clay X-T (Inventive Example) | Clays X-R (values in accordance with the Invention) |
| --- | --- | --- | --- | --- |
| Color | Off-White | Off-White | Off-White | Off-White |
| Physical Form | Acid-Dried, Milled | Spray-Dried, Milled | Spray-Dried, Milled | Spray-Dried, Milled |
| Specific Gravity | 2.60 | 2.60 | 2.60 | about 2.60 |
| Moisture, % (as produced) | 0.64 | 0.50 | 0.60 | < about 1.0 |
| pH (@ 28% solids) | 4.1 | 7.1 | 6.8 | about 6.0–7.5 |
| Brightness, % | 80.4 | 82.4 | 83.5 | about 82.5–84.5 |
| Stokes Equivalent Particle Diameter, microns | 4.35 | 4.03 | 5.25 | about 4.5–6.0 |
| Malvern (LLS) Median P.S., microns | 8.7 | 7.8 | 10.0 | about 9.0–10.5 |
| BET Surface Area, $m^2/g$ | 7.5 | 10.0 | 9.7 | about 8–11 |
| Aspect Ratio (Sphericity Model) | 11.4 | 11.5 | 13.1 | about 12–14 |
| Chemical Analysis (by XRF): | | | | |

TABLE 1-C-continued

Physical and Chemical Properties for Coarse Particle Clays

| Physical Properties: | ASP-400 (Comparative Example) | Huber-35 (Comparative Example) | Clay X-T (Inventive Example) | Clays X-R (values in accordance with the Invention) |
|---|---|---|---|---|
| % $TiO_2$ | 1.38 | 0.73 | 0.55 | ≦ about 0.65 |
| % $Fe_2O_3$ | 0.43 | 0.38 | 0.39 | — |
| % $Al_2O_3$ | 39.53 | 39.72 | 39.67 | — |
| % $SiO_2$ | 45.67 | 45.51 | 45.68 | — |
| % $Na_2O$ | 0.07 | 0.15 | 0.16 | — |

EXAMPLE 2

In Example 2 (and in Example 3 below), the lower paste viscosity benefits provided by the invention versus the comparative coarse particle clay ASP-400 are clearly demonstrated in two different polyester thermoset applications. In Example 2, a clay in accordance with the invention (specifically Clay X-T of Example 1) is compared to ASP-400 clay as a filler in a SMC type formulation using Ashland Chemical's Phase Beta Resin, Aropol 50421. The clay filler loading in this SMC formulation (see Table 2-A) was 90 phr (phr = parts per hundred resin on a weight basis) wherein each clay was high speed dispersed into the Phase Beta Resin using a Cowles dissolver unit. The initial paste viscosities without thickener are compared in Table 2-B, which ) clearly shows that Clay X-T yields a significantly lower Brookfield viscosity value than ASP-400 (22,000 cps versus 32,000 cps). Table 2-C shows the aged viscosities of the clays after addition of the B-Side thickener, and indicates essentially equivalent viscosity results.

TABLE 2-A

SMC FORMULATION USING AROPOL 50421 AND CLAY

| INGREDIENTS | GRAMS | PHR |
|---|---|---|
| Ashland Resin #50421 - Phase Beta Resin | 482.35 | 100 |
| TBPB | 7.24 | 1.5 |
| PBQ-10% | 1.45 | 0.3 |
| Zinc Stearate | 21.75 | 4.5 |
| Clay Filler | 434.11 | 90 |
| B-side thickener | 53.06 | 11 |
| TOTAL | 999.92 grams | |
| | 2.2 lbs | |

TABLE 2-B

Viscosity of "A" Side Without B-Side Thickener

| Test System | Brookfield Viscometer Model | Spindle/RPM | Initial BF Viscosity, cps | Temp., deg. C. | Remarks |
|---|---|---|---|---|---|
| Neat Resin #50421 | RVT | 2/5 | 140 | 21 | |
| w/ ASP-400 | RVT | 7/10 | 32,000 | 32 | 7' filler mix time. |
| w/ Clay X-T (from Ex. 1) | RVT | 7/10 | 22,000 | 34 | 4' filler mix time. |

TABLE 2-C

Viscosity of "A" Side With B-Side Thickener

| Test System Using Resin #50421 | Brookfield Viscometer Model | Spindle/RPM | BF Viscosity, cps | Temp., deg. C. | SPI Gel Time, minutes | Remarks |
|---|---|---|---|---|---|---|
| w/ ASP-400 | RVT | 7/10 | 37,400 | 35 | 27 | Initial visc. |
| @ 60 mins. | RVT | 7/10 | 246,000 | N/A | | |
| @ 1-day | HAT | T-F/1 | 6,000,000 | 23.7 | | |
| @ 9-days | HAT | T-F/1 | 18,000,000 | 23.3 | | |
| w/ Clay X-T | RVT | 7/10 | 28,400 | 35 | 34:40 | Initial visc. |
| @ 60 mins. | RVT | 7/10 | 224,800 | N/A | | |
| @ 1 day | HAT | T-F/1 | 5,900,000 | 23.6 | | |
| @ 9-days | HAT | T-F/1 | 19,200,000 | 23.3 | | |

EXAMPLE 3

In Example 3, ASP-400 and a clay in accordance with the invention (Clay X-T of Example 1) were once again compared as coarse particle clay fillers but in a Pultrusion type formulation using Reichold's Dion 31038-00 resin. The clay filler loadings examined in this study were 50 and 100 phr in order to determine comparative viscosity effects as a function of filler content. Both clays were high speed dispersed into the pultrusion resin using a Cowles dissolver unit. The initial paste viscosities are compared in Table 3, which clearly shows that Clay X-T of the present invention yields a much lower Brookfield viscosity at the high filler loading of 100 phr. Surprisingly, the viscosities provided by the ASP-400 and Clay X-T are essentially equivalent at the lower filler loading. This feature suggests that the clay's specific surface area may be the predominant viscosity building factor at low to intermediate filler loadings, hence the observed equivalency between ASP-400 and Clay X-T at 50 phr. In contrast, other physical factors (like particle shape, particle size distribution, particle packing, etc.) may possibly take over at high filler loadings where particle to particle interactions from crowding considerations become important. At high clay loadings, these points serve to further illustrate the unique properties and unexpected performance benefits of the invention (embodied in Clay X-T) as a filler for polyester thermoset composites.

stream produced by centrifugal fractionation of a middle Georgia, Cretaceous clay crude. Huber 35 (from J. M. Huber Corporation—Macon, Ga. ) is a dry pulverized, coarse particle size underflow clay derived from a middle Georgia, Cretaceous clay crude (essentially product 3 of FIG. 1). Also included in the study are ASP-400 and a clay in accordance with the invention (Clay X-T of Example 1). The important physical properties of each test clay (i.e., Stokes equivalent particle diameter, BET surface area and particle aspect ratio) are summarized in Table 4 along with their respective paste viscosity values.

Table 4 reveals that the clays Polygloss 90, Huber 80, Huber 35 and ASP-400 define a clay series wherein the corresponding BET surface area systematically decreases from 21.6 to 7.9 $m^2/g$, respectively. As the BET surface area decreases, initial paste viscosities in the SMC resin are seen to decrease. Unfortunately, direct head-to-head comparisons of initial paste viscosity can not be made across the entire clay series because the two formulations containing the fine

TABLE 3

Clay Viscosity Study in Pultrusion Resin

| Clay Filler System | Clay Loading, PHR | Brookfield Viscometer Model | Initial BF Viscosity, cps (Spindle #/rpm)* |
|---|---|---|---|
| Unfilled Dion 31038-00 Resin | 0 | RVT | 500 (#2/20) |
| ASP-400P | 50 | RVT | 3,900 (#5/20) |
| Clay X-T | 50 | RVT | 4,100 (#5/20) |
| ASP-400P | 100 | HBT | 54,400 (#2/20) |
| Clay X-T | 100 | HBT | 35,200 (#2/20) |

Note: *All initial BF Viscosities were measured at 23 deg. C.

EXAMPLE 4

In this example, various fine particle and coarse particle size clays are compared as fillers in a SMC type polyester resin formulation wherein clays having BET surface areas spanning the range from about 8 to 22 $m^2/g$ are evaluated for their effects on paste viscosity. This example illustrates the relationship between clay surface area and initial paste viscosity. The clay filler loadings employed were 100 phr and 82 phr. The SMC type resin employed was Alpha Owens-Corning's AOC E-4297-9 resin. The clays were high speed dispersed into the resin using a Cowles dissolver unit and the paste viscosities were subsequently read after 1 hour at 32 deg. C. using a HBT Model Brookfield Viscometer.

The clays employed in this paste viscosity study are listed in Table 4. Polygloss 90 is a very fine particle size, dry pulverized clay product manufactured by J. M. Huber Corporation Wrens, Ga. that is derived from a fine particle, east Georgia Tertiary clay crude. Huber 80 is a fine particle size, dry pulverized clay product manufactured by J. M. Huber Corporation-Macon, Ga. that is derived from an overflow particle size clays were so viscous that measurements could not be made with a HBT Model Viscometer without reducing the clay filler loading from 100 to 82 phr; however, the general viscosity trend is nonetheless very clear. This paste viscosity data is in general agreement with conventional thinking that polyester compound viscosity will decrease as the surface area of the incorporated fillers decrease. In contrast, the BET surface area and paste viscosity properties of Clay X-T (from Example 1) do not fit this conventional property/performance trend as it easily provides the lowest viscosity value at the 100 phr loading level despite having a higher surface area than ASP-400. In analogy with the results in Example 3, the paste viscosities provided by ASP-400 and Clay X-T were once again essentially equivalent at the lower filler loading level. At high clay loadings, these points serve to further illustrate the unique properties and unexpected performance benefits of the invention as a filler for polyester thermoset composites.

TABLE 4

Testing of Various Clay Fillers in a SMC Type Resin: Paste Viscosity Study*

| Physcial Properties of Test Clays: | Polygloss 90 | Huber 80 | Huber 35 (lot 559) | ASP-400 | Clay X-T (Ex. 1) |
|---|---|---|---|---|---|
| Specific Gravity | 2.60 | 2.60 | 2.60 | 2.60 | 2.60 |
| Stokes Equivalent Particle Diameter, microns | 0.23 | 0.49 | 4.15 | 4.37 | 5.25 |
| BET Surface Area, | 21.64 | 16.15 | 10.28 | 7.94 | 9.73 |

TABLE 4-continued

Testing of Various Clay Fillers in a SMC Type Resin:
Paste Viscosity Study*

| Physcial Properties of Test Clays: | Polygloss 90 | Huber 80 | Huber 35 (lot 559) | ASP-400 | Clay X-T (Ex. 1) |
|---|---|---|---|---|---|
| $m^2/g$ | | | | | |
| Aspect Ratio (Sphericity Model) | 4.9 | 7.2 | 11.6 | 11.1 | 13.1 |
| HBT BF Viscosity @ 100 PHR (#4 Spindle, 20 rpm), cps | Cannot Measure | Cannot Measure | 38,000 | 33,600 | 18,880 |
| HBT BF Viscosity @ 82 PHR (#4 Spindle, 20 rpm), cps | 55,400 | 30,800 | — | 12,400 | 12,400 |

NOTE:
*The HBT Brookfield Viscosity of each clay was determined in accordance with the following test conditions:
SMC Polyester Resin = Alpha Owens-Corning AOC E-4297-9,
Age Time/Temp. = 1 Hour @ 32 deg. C.

EXAMPLE 5

In this example, a series of coarse particle size clays were produced for viscosity evaluation in a tub and shower polyester thermoset resin formulation. Several different coarse particle size clays were produced from various underflow product streams that yielded clays having a wide range of particle sizes. On the basis of average Stokes equivalent particle diameter, coarse particle size clays ranging in particle diameter from 3.4 to 5.9 microns were produced and studied. These clays (labeled as test clays A–I in Table 5) were produced by collecting representative test products after either the first, second or third centrifuge passes (as outlined in the process scheme of FIG. 1) and by varying the relative particle size cuts made at these various centrifuge steps. Comparative physical properties for these coarse particle size clays are summarized in Table 5. The purpose of this example is to illustrate the relationship between clay particle size and initial paste viscosity. The clay filler loading employed was 82 phr. The polyester resin employed was Alpha Owens-Corning's AOC 85-35G resin. The coarse particle size clays were high speed dispersed into this resin using a Cowles dissolver unit and the paste viscosities were subsequently read after 1 day at 32 deg. C. using a HBT Model Brookfield Viscometer. The resultant paste viscosities are presented in Table 5 and also shown graphically in FIG. 2.

Figure 2:
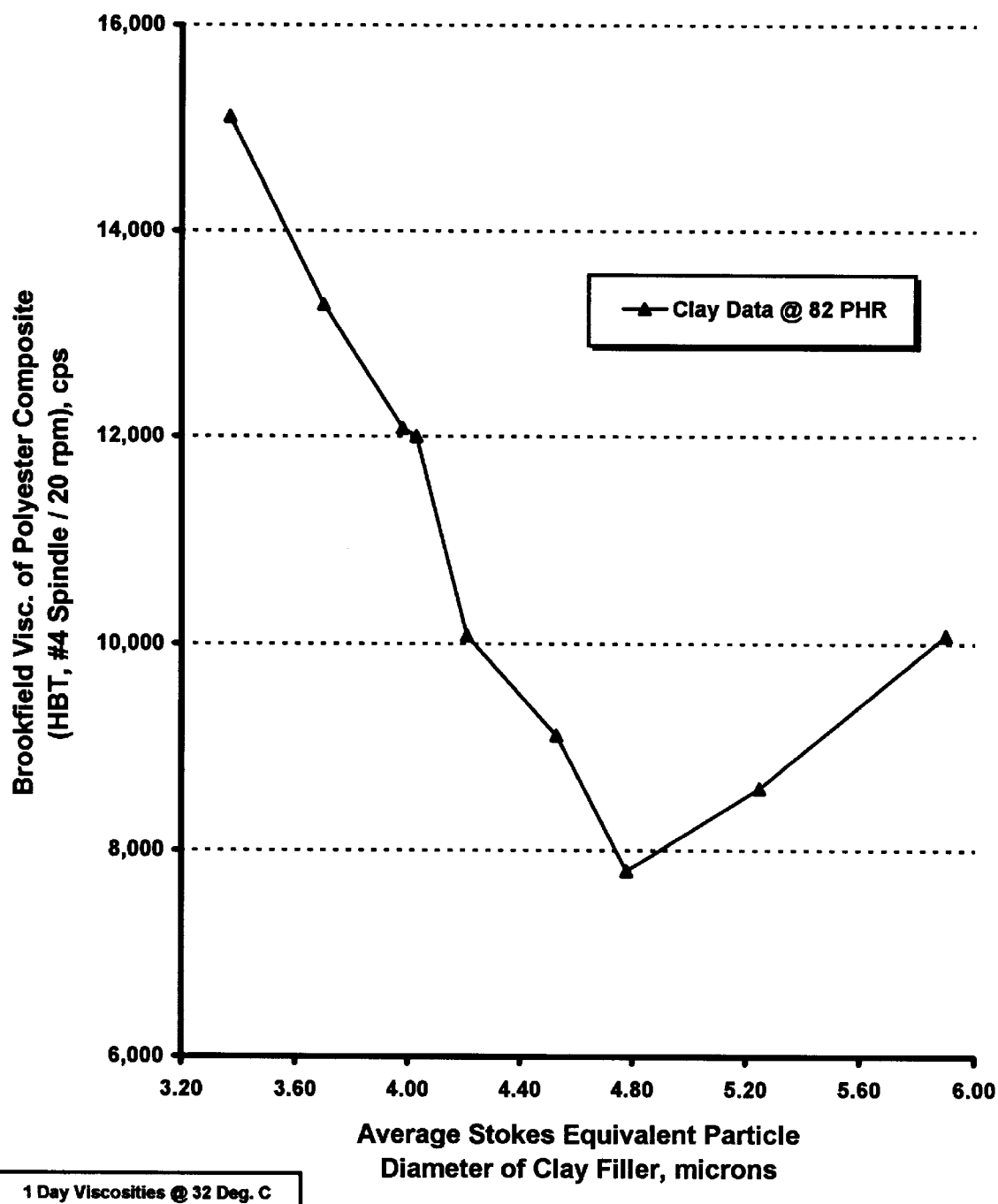
FIG. 2 is a graph of Brookfield viscosity (in cps) for a particular clay filled polyester compound plotted as a function of the clay's particle diameter (in microns).

In FIG. 2, a viscosity profile curve is shown wherein the average Stokes equivalent clay particle diameter (in microns) is plotted against Brookfield viscosity (in cps). Surprisingly, this plot clearly shows that the resultant viscosity does not continue to decrease in a linear fashion with clay particle diameter over the entire particle size range explored. In fact, the test data indicate that a minimum viscosity well is obtained at clay particle diameters of about 4.5–5.5 microns. In this resin system, clays falling outside the particle diameter range of 4.5–5.5 microns yielded a higher viscosity value, which serves to further illustrate the unique properties and unexpected performance benefits of the coarse particle clays of this invention.

TABLE 5

Viscosity Study on Various Coarse Particle Size Clays:
Tub and Shower Resin*

| Physical Properties of Test Clays: | A | B | C | D | E | F | G | H | I |
|---|---|---|---|---|---|---|---|---|---|
| Specific Gravity | 2.60 | 2.60 | 2.60 | 2.60 | 2.60 | 2.60 | 2.60 | 2.60 | 2.60 |
| Stokes Equivalent Particle Dia., microns | 3.37 | 3.70 | 3.98 | 4.03 | 4.21 | 4.53 | 4.78 | 5.25 | 5.90 |
| Malvern (LLS) Median P.S., microns | 6.31 | 7.25 | 6.98 | 7.79 | 7.98 | 7.75 | 8.60 | 10.03 | 10.57 |
| Malvern Specific Surface Area, $m^2/g$ | 0.965 | 0.924 | 0.809 | 0.881 | 0.810 | 0.818 | 0.832 | 0.740 | 0.737 |
| BET Surface Area, $m^2/g$ | 11.0 | 10.4 | 9.55 | 10.1 | 9.85 | 9.69 | 10.3 | 9.73 | 9.73 |
| Aspect Ratio (Sphericity Model) | 11.4 | 11.3 | 11.8 | 11.5 | 12.2 | 11.8 | 12.4 | 13.1 | 13.2 |

TABLE 5-continued

Viscosity Study on Various Coarse Particle Size Clays:
Tub and Shower Resin*

| Physical Properties of Test Clays: | A | B | C | D | E | F | G | H | I |
|---|---|---|---|---|---|---|---|---|---|
| BF Visc. @ 82 PHR (#4 Spindle, 20 rpm), cps | 15,120 | 13,280 | 12,080 | 12,000 | 10,080 | 9,120 | 7,800 | 8,600 | 10,080 |

NOTE:
*The HBT Brookfield Viscosity of each clay was determined in a tub & shower polyester resin in accordance with the following test conditions:
Polyester Resin = Alpha Owens-Corning AOC 85-35G
Age Time/Temp. = 1 Day @ 32 Deg. C.

EXAMPLE 6

In this example, the relative viscosity properties of ASP-400, a clay in accordance with the invention (Clay X-T from Example 1), and a clay/ATH combination are compared in a general purpose, unsaturated Polyester resin (namely Aristech Resin MR 13017, which has a styrene content of about 33%). The total filler loading of clay (or clay/ATH blend) employed in this study was 90 phr, wherein each filler was high speed dispersed into the polyester resin using a Cowles dissolver unit. The clay/ATH blend consisted of a 85/15 weight ratio combination of Clay X-T to SB-432, respectively. The SB-432 component is a coarse particle size, dry ground ATH product (ATH=Alumina Trihydrate) manufactured by J. M. Huber Corporation—Pairmount, Ga. The physical properties of the SB-432 ATH are compared to those of Clay X-T in Table 6. Important physical properties with regard to viscosity characteristics include BET surface area and average Stokes equivalent particle diameter. As shown in Table 6, the SB-432 ATH is significantly coarser in particle diameter (by x-ray Sedigraph measurement) and significantly lower in BET surface area versus the coarse particle size clay.

The initial paste viscosities measured for ASP-400, Clay X-T and the 85/15 Clay X-T/SB432 blend are summarized in Table 7. All paste viscosities were measured at approximately 36 deg. C. using a HBT Model Brookfield Viscometer. The test data once again point out the lower viscosity characteristics of Clay X-T versus that of the comparative coarse particle clay ASP-400. In addition, the test data indicate that a further significant reduction in viscosity can be achieved by replacing only 15% by weight of the clay (i.e., Clay X-T) with SB-432 ATH.

TABLE 6

Comparative Physical Properties of ATH and Clay X-T

| Physical Properties: | OE-100 ATH | SB-432 ATH | Clay X-T (from Ex. 1) |
|---|---|---|---|
| Color | White | White | Off-White |
| Specific Gravity | 2.42 | 2.42 | 2.60 |
| pH (@ 28% solids) | 7.1 | 8.0 | 6.8 |
| Brightness, % | 95.0 | 91.6 | 83.5 |
| X-ray Sedigraph P.S., % <2 microns | 2.0 | 8.4 | 27.0 |
| Stokes Equivalent Particle | 35 | 8.85 | 5.25 |

TABLE 6-continued

Comparative Physical Properties of ATH and Clay X-T

| Physical Properties: | OE-100 ATH | SB-432 ATH | Clay X-T (from Ex. 1) |
|---|---|---|---|
| Diameter, microns Malvern (LLS) Median P.S., microns | 44.7 | 8.55 | 10.0 |
| BET Surface Area, m²/g | 0.24 | 2.0 | 9.7 |

TABLE 7

Initial Paste Viscosities in a General Purpose Polyester Resin
(Fillers @ 90 PHR in Aristech Resin MR 13017)

| Filler System | Brookfield Viscometer Model | Brookfield Viscosity (#5 Spindle/20 rpm), cps | Temp., deg. C. |
|---|---|---|---|
| ASP-400 | HBT | 26,400 | 35.5 |
| Clay X-T (from Ex. 1) | HBT | 20,800 | 36.0 |
| Clay X-T/SB-432 @ 85/15 Wt. Ratio | HBT | 17,600 | 36.0 |

Figure 3:
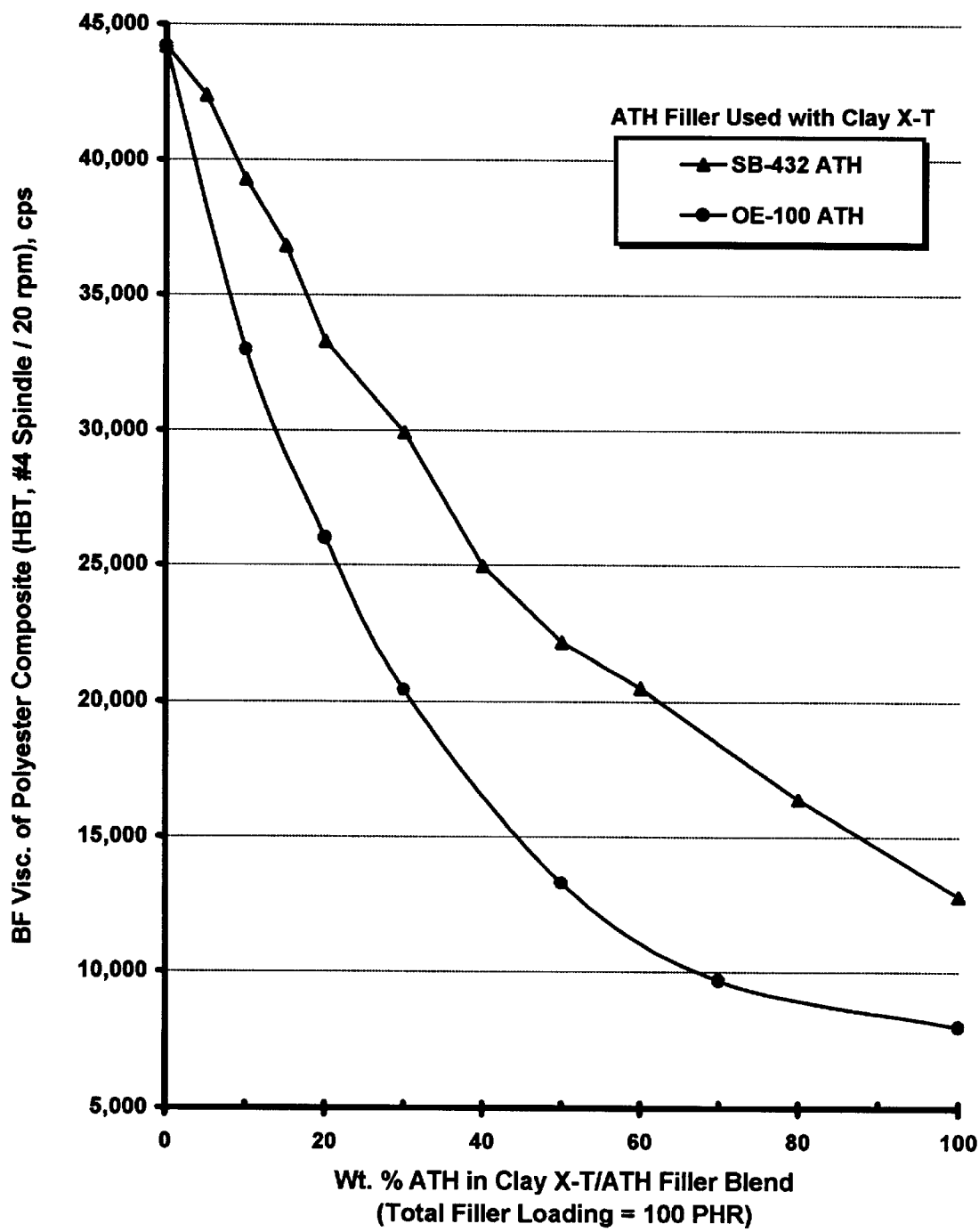
FIG. 3 is a graph of Brookfield viscosity (in cps) for a polyester compound containing a clay/ATH filler combination plotted as a function of the weight % of ATH in the filler blend.

In a further set of viscosity experiments using the same Aristech Resin MR 13017, other weight ratio combinations of Clay X-T and SB-432 ATH were examined at a total filler loading of 100 phr. The viscosity results are shown in FIG. 3, wherein the weight % of ATH in the Clay X-T/ATH filler blend has been plotted against the initial Brookfield Viscosity (in cps). This viscosity curve clearly shows that further reductions in initial viscosity can be achieved with greater levels of clay replacement with SB-432 ATH. A second viscosity curve is also presented in FIG. 3, wherein a much lower surface area ATH product (namely OE-100) was used in the clay/ATH blends in place of the SB-432 ATH. OE-100 is a very coarse particle size, very low surface area, unground white ATH product manufactured by J. M. Huber Corporation. The physical properties of the OE-100 ATH are compared to those of SB-432 ATH and Clay X-T in Table 6. As before, the weight ratio combinations of Clay X-T and ATH were examined at a total filler loading of 100 phr. The Clay X-T/OE-100 viscosity curve clearly shows that greater reductions in paste viscosity can be obtained by using the lower surface area ATH filler, OE-100, if the resulting physical properties of the thermoset composite can accommodate the significantly larger Stokes equivalent particle diameter of OE-100 versus SB-432 (35 versus 8.8 microns, respectively).

EXAMPLE 7

Figure 4:
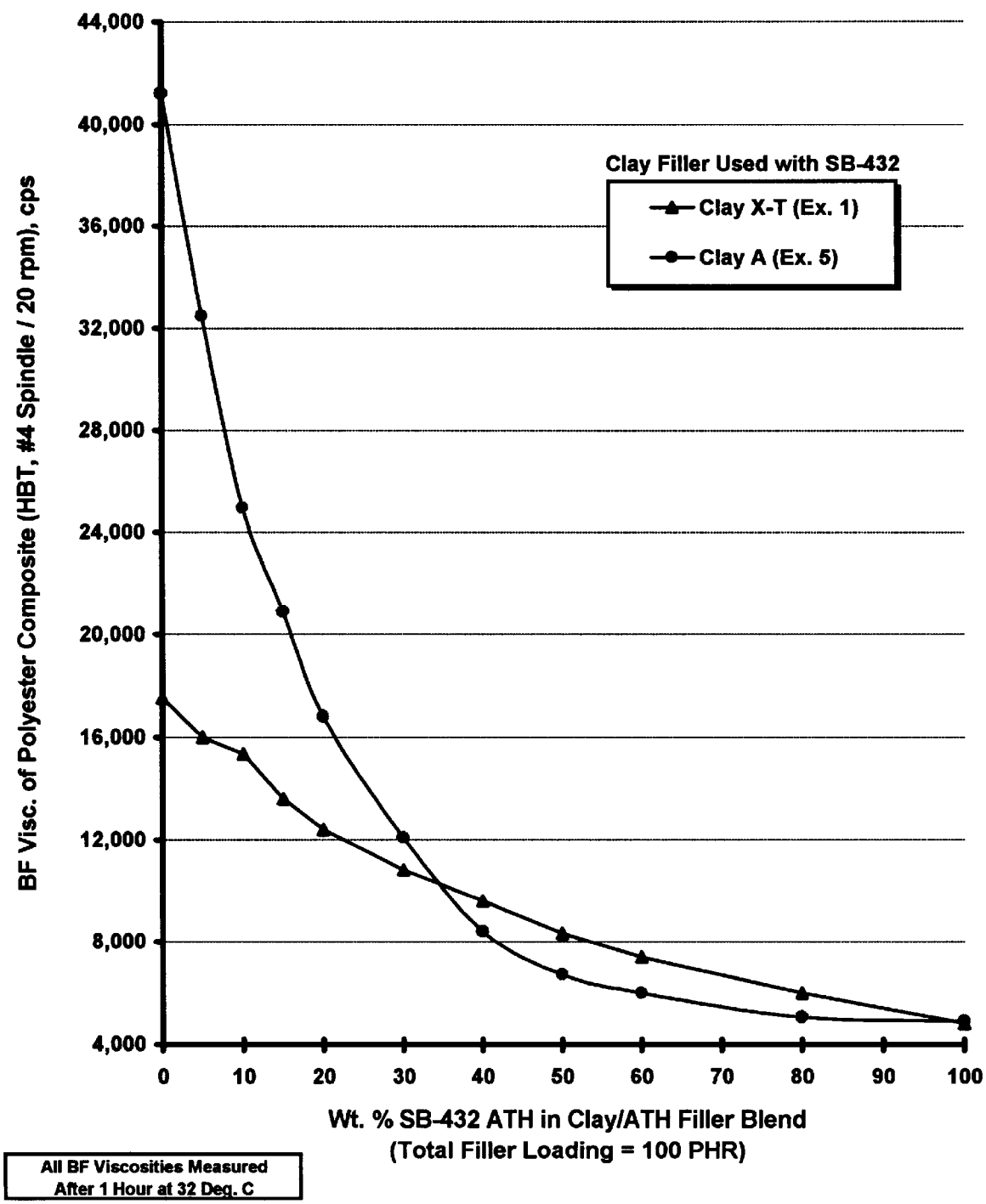
FIG. 4 is a graph of Brookfield viscosity (in cps) for a polyester compound containing clay/ATH filler combinations plotted as a function of the weight % of ATH in the filler blend.

In this paste viscosity study, a follow-up set of clay/ATH experiments were conducted wherein a different lower viscosity, general purpose polyester resin (Aropol Q6586 from Ashland Chemical) was employed. Two different coarse particle size clays (namely Clay X-T from Example 1 and Clay A from Example 5) were each examined in combination with SB-432 ATH at various clay/ATH weight ratios. The total filler loading was maintained at 100 phr. As shown in FIG. 4, the weight % of SB-432 ATH in each filler blend has been plotted against the initial Brookfield Viscosity (in cps). These viscosity curves once again show that polyester compound viscosities can be significantly reduced by replacing increasing amounts of coarse particle size clay (either Clay X-T or Clay A) with SB-432 ATH. Significant reductions in paste viscosity are observed for SB-432 ATH additions up to a clay/ATH weight ratio of about 50/50, whereafter the relative amount of viscosity improvement gained from replacing coarse particle clay with ATH begins to greatly diminish as evidenced by the flattening out of the viscosity profile curves. It is also interesting to note that the relative amount of viscosity reduction obtained is proportionally greater (at a given replacement level with ATH) for the finer particle size clay (Clay A) as compared to a coarse clay in accordance with the invention (Clay X-T), hence the more rapid fall in paste viscosity seen in FIG. 4 for the Clay A/SB-432 curve. The data indicate that the coarse particle clays of this invention, when blended with up to about 30% by weight of a low surface area ATH, will yield polyester compounds providing paste viscosity advantages over those using analogous weight ratio blends comprising conventional coarse particle clays.

In summary, the viscosity data presented in Examples 6 and 7 serve to illustrate the novel benefits associated with using very low surface area ATH fillers in combination with the invention for use in polyester molding compounds. The preferred ATH fillers to use with the coarse particle size clays of this invention are those having a BET surface area <5 $m^2/g$, and more preferably <3 $m^2/g$. Based on the test data presented, clay/ATH blend ratio combinations ranging from 95/5 to about 70/30 by weight are thought to be particularly useful as a filler package for polyester composites in that they offer very low viscosity build and low specific gravity. Given that ATH has a lower specific gravity than kaolin clay (2.42 g/ml versus 2.6 g/ml), the partial replacement of clay with ATH helps to further reduce the weight of polyester composites relative to traditional calcium carbonate filled SMC or BMC compounds. In addition to reducing the compound viscosity relative to using only clay, the ATH fillers provide desirable flame retardancy properties to the composite. Total replacement of coarse particle clay with ATH is however not attractive for both economic and performance reasons. ATH is considerably more expensive than clay; therefore, the use of high replacement levels will increase cost. In addition, the ATH fillers have less particle aspect ratio than the invention and accordingly will detract from the surface finish properties of the plastic composite relative to having used all coarse particle clay in accordance with the invention. Therefore, one must carefully balance the flame retardancy plus the viscosity reduction and specific gravity reduction benefits of ATH use with clay against the increased cost and reduced surface finish disadvantages in a given application to achieve the best cost versus performance properties.

EXAMPLE 8

In this study, the SMC formulation of Table 2-A was again used except that a Phase Alpha Resin (Aropol 50405 from Ashland Chemical) was used in place of the Phase Beta Resin. Two different coarse particle size clays (Clays F and I of Example 5) were tested in this resin at a clay filler loading of 90 phr. Each clay was high speed dispersed into the Phase Alpha Resin using a Cowles dissolver unit. Initial paste viscosities were measured and then final physical properties were determined on molded specimens (see Table 8 for test data). Conditions for molding were 400 psi pressure, 2 minute cure, 50% tool coverage, 2 ply, 390 grams and the press was set to fast close (7 seconds). The Phase Alpha formulations were molded at 300 deg. F. Physical properties determined included DOI (Distinctness Of reflected Image), as well as flexural strength and tensile strength (both measured in the vertical direction). Physical properties for the two test clays (F and I) are summarized in Table 5.

It should be noted that Clays F and I in this study (at 4.53 microns versus 5.90 microns, respectively) are close to the far extremes with respect to the Stokes equivalent particle diameter range for the coarse particle clays of the invention. The viscosity data of Table 8 show that the coarser particle size clay (Clay I) yields the lower viscosity value. Reduced paste viscosity allows for better wetting of individual glass fibers in the SMC as well as permitting the compounding of SMC with higher glass loadings. From Clay F to Clay I, the particle aspect ratio correspondingly increases from about 11.8:1 to 13.2:1. Although this change represents a relatively small increase in average particle aspect ratio, it is nevertheless reflected in the final physical properties obtained. The data of Table 8 show that both test clays provide good surface quality and good physical properties; however, Clay I does provide some small improvements in DOI, flexural strength and tensile strength versus Clay F. These improvements serve to illustrate the benefits of a high particle aspect ratio as embodied by the invention.

TABLE 8

A-Paste Viscosity and Physical Properties for Clay Filled SMC System: Ashland Resin #50405 - Phase Alpha Resin

| Filler System @ 90 PHR | Brookfield Viscometer Model | Spindle/RPM | Initial A-Paste BF Viscosity, cps | DOI | Flexural Stength, psi | Tensile Strength, psi |
|---|---|---|---|---|---|---|
| w/ Clay F (from Ex. 5) | RVT | #6 @ 10 rpm | 47,000 | 76.7 | 17,920 | 6970 |
| w/ Clay I (from Ex. 5) | RVT | #6 @ 10 rpm | 39,000 | 83.3 | 18,970 | 8580 |

EXAMPLE 9

In this example, the pigment performance properties of Clay X-T of this invention are compared to those of an industry standard (Huber 35) in a brick red, exterior latex house paint. Formulation specifics associated with this brick red exterior paint are provided in Table 9-A wherein the various grind ingredients were high speed dispersed for 10 minutes and then subsequently combined with the letdown portion using low speed mixing for 15 minutes. All ingredient amounts are expressed in lbs./100 gallons of paint. Paint formulations A and B in Table 9-A are exactly identical except for the coarse particle size clay employed. For the various paint ingredients identified by an industry tradename, the associated manufacturer is indicated to the right in parenthesis. For both Paints A and B, calculations indicate a target solids content of 53.59% by weight and a P.V.C. (Pigment Volume Concentration) of 37.00%. The chemical and physical properties of Huber 35 and Clay X-T are compared in Table 1-C.

In Table 9-B, the paint performance data for Paints A and B are presented. Standard optical readings were made from paint drawdowns on conventional black and white contrast cards whereas the subsequent QUV exposure data were collected from paint drawdowns made on aluminum metal sheet. In terms of initial paint properties, the performance data indicate that Clay X-T and Huber 35 are essentially equivalent in all regards, including: consistency, pH, Hegman Grind, directional reflectance, contrast ratio, sheen, gloss, "a" Value, and leveling properties. However, upon QUV exposure for only 442 hours, differences in UV resistance properties are seen in the two paint films as reflected by their respective Delta E values and "a" Values. Good Uw resistance is a particularly important performance criteria for exterior latex paints given their repeated exposure to sunlight and the elements. The improved UV resistance of Paint B (containing Clay X-T) is demonstrated by its lower Delta E value as well as by the improved stability of its "a" color value upon exposure. The "a" Value is the red/green color scale in the Hunter L,a,b Color Space measurement system. After QUV exposure, the decreased "a" value associated with Paint A (containing Huber 35) indicates that the red latex paint is becoming less red in appearance and more green, which is a result of UV degradation. This data illustrate the excellent utility of the coarse particle size clays of this invention as pigment extenders in various paint applications. Although not apparent in this red pigmented paint formulation, the higher brightness properties of the invention (about 83.5%) will also be beneficial in many paint formulations versus the prior art coarse particle clays.

TABLE 9-A

Evaluation of Coarse Clays in a Brick Red Exterior Latex House Paint

| | | |
|---|---|---|
| PRIMARY PIGMENT: | Kroma 8097 | Kroma 8097 |
| EXTENDER PIGMENT: | Huber 35 | Clay X-T |
| RESIN: | Ucar 6379 | Ucar 6379 |
| Paint Identification: | A | B |
| INGREDIENTS | Pounds/100 Gallons | |
| GRIND: | | |
| Water | 250.05 | 250.05 |
| Natrosol 250 MBR (Aqualon Co.) | 4.00 | 4.00 |
| Propylene Glycol | 25.92 | 25.92 |
| Troysan Polyphase AF-1 (Troy Chemical) | 6.00 | 6.00 |
| Colloid 643 (Rhone-Poulenc, Inc.) | 2.00 | 2.00 |
| Tamol 850-30 (Rohm & Haas Co.) | 8.00 | 8.00 |
| AMP-95 (Angus Chemical Co.) | 1.00 | 1.00 |
| Nuosept 95 (Huls America, Inc.) | 1.50 | 1.50 |
| Igepal CO-630 (Rhone-Poulenc, Inc.) | 2.00 | 2.00 |
| KTPP | 1.00 | 1.00 |
| Kroma 8097 (Harcros Pigments) | 100.00 | 100.00 |
| Huber 35 (I. M. Huber Corp.) | 243.44 | |
| Clay X-T (from Example 1) | | 243.44 |
| Disperse the above at high speed for 10 minutes. Add the ingredients below. Mix at low speed for 15minutes. | | |
| LETDOWN: | | |
| Water | 24.84 | 24.84 |
| Natrosol 250 MBR (Aqualon Co.) | 1.00 | 1.00 |
| AMP-95 (Angus Chemical Co.) | 1.00 | 1.00 |
| Colloid 643 (Rhone-Poulenc, Inc.) | 2.00 | 2.00 |
| Texanol (Eastman Chemical Co.) | 11.85 | 11.85 |
| Ucar 6379 (Union Carbide Corp.) | 416.75 | 416.75 |
| TOTALS: | 1102.35 | 1102.35 |

TABLE 9-B

Performance Data for Coarse Clays in a Brick Red Exterior Latex House Paint

| PAINT IDENTIFICATION | A | B |
|---|---|---|
| PIGMENT IDENTIFICATION | Huber 35 | Clay X-T |
| CALCULATED VALUES: | | |
| Solids by weight, % | 53.59 | 53.59 |
| Solids by volume, % | 38.64 | 38.64 |
| P.V.C., % | 37.00 | 37.00 |
| PERFORMANCE DATA: | | |
| Solids by Evaporation, % | 53.23 | 53.32 |
| Consistency, Krebs Units | 93 | 92 |
| pH | 9.07 | 9.02 |
| Hegman Grind | 5.0 | 5.0 |
| Directional Reflectance, Y Value | 7.70 | 7.62 |
| Contrast Ratio | 0.996 | 1.000 |
| Sheen, 85 degree | 4.4 | 4.6 |

TABLE 9-B-continued

Performance Data for Coarse Clays in a Brick
Red Exterior Latex House Paint

| PAINT IDENTIFICATION<br>PIGMENT IDENTIFICATION | A<br>Huber 35 | B<br>Clay X-T |
|---|---|---|
| Gloss, 60 degree | 3.0 | 3.1 |
| Leveling | 6 | 7 |
| QUV Exposure* (@442 hours): | | |
| Y Value: (Before Exposure) | 6.56 | 6.55 |
| Y Value: (After Exposure) | 7.13 | 6.98 |
| Brightness: (Before Exposure) | 4.26 | 4.24 |
| Brightness: (After Exposure) | 4.87 | 4.75 |
| a Value: (Before Exposure) | 16.47 | 16.50 |
| a Value: (After Exposure) | 15.95 | 16.53 |
| Delta E: | 1.28 | 0.88 |

EXAMPLE 10

In this example, the relative viscosity characteristics of a coarse particle clay in accordance with the invention (Clay X-T from Example 1) are compared to those of a conventional coarse particle clay (Huber 35) in an epoxy thermoset system using Shell Chemical's Epon 862 epoxy resin. This epoxy resin system is of particular interest for use in CIPP (cured-in-place pipe) applications. Clay filler loadings ranging from about 67 to 100 phr were examined in this viscosity study wherein the coarse particle clays were high speed dispersed into the epoxy resin using a Cowles dissolver unit. The paste viscosities were subsequently read after 1 hour at 32 deg. C. using a HBT Model Brookfield Viscometer equipped with a No. 6 spindle. The viscosity results for Clay X-T and Huber 35 are compared in FIG. 5.

Figure 5:
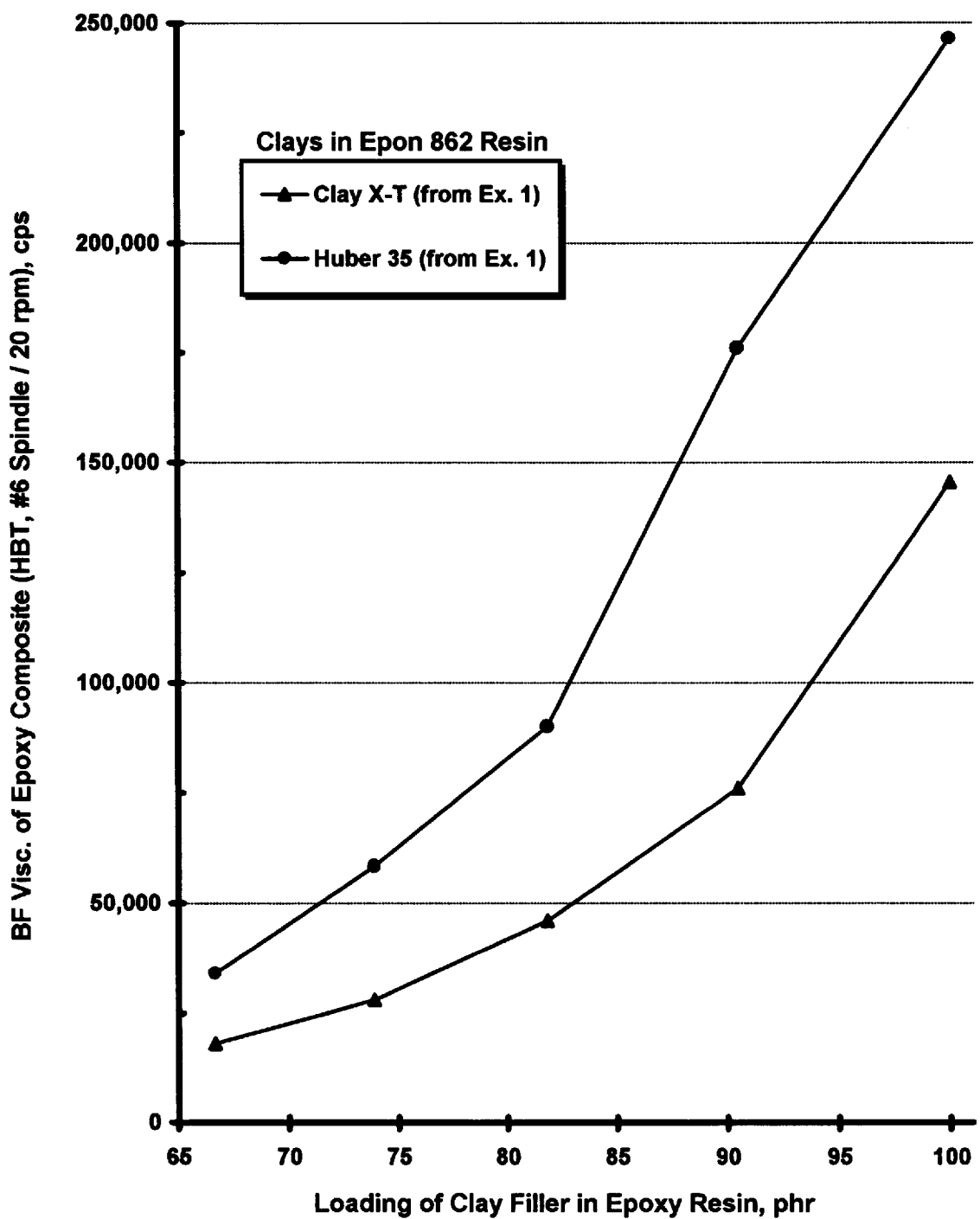
FIG. 5 is a graph of Brookfield viscosity for an epoxy compound containing coarse particle clay fillers, plotted as a function of clay filler loading.

The viscosity curves presented in FIG. 5 clearly show that significantly lower epoxy compound viscosities are obtained with a coarse particle clay in accordance with the invention over the entire filler loading range examined. In fact, closer inspection of the test data indicates that the net difference in viscosity (in cps) increases as the clay filler loading is increased. For example, at 66.7 phr the difference in Brookfield viscosity is about 16,000 cps, whereas at 100 phr the difference is a much larger 100,000 cps. These findings clearly indicate that the viscosity advantages provided by the invention over conventional coarse particle clays are not limited to just polyester resins, but are observed in many different resin systems.

While the invention has been described herein with reference to specific and preferred embodiments, it is understood that modifications, substitutions, omissions and changes may be made without departing from the spirit and scope of the invention defined in the appended claims.

We claim:

1. A kaolin clay comprising:
 an average Stokes equivalent particle diameter of about 4.5–6.0 microns; and
 a BET surface area of about 8–11 $m^2/g$.

2. A kaolin clay according to claim 1, further comprising an average particle aspect ratio of about 12:1 to about 14:1 as determined by Sphericity Model calculation.

3. A kaolin clay according to claim 1, for comprising a median particle size of about 9.0–10.5 microns as determined by laser light scattering/Fraunhofer diffraction measurement.

4. A kaolin clay according to claim 2, further comprising a median particle size of about 9.0–10.5 microns as determined by laser light scattering/Fraunhofer diffraction measurement.

5. A kaolin clay according to claim 1, further comprising an anatase $TiO_2$ content of no greater than about 0.65 wt %.

6. A kaolin clay according to claim 4, further comprising an anatase $TiO_2$ content of no greater than about 0.65 wt %.

7. A kaolin clay according to claim 1, further comprising a +325 mesh residue content of no greater than about 0.1 wt %.

8. A kaolin clay according to claim 1, wherein said average Stokes equivalent particle diameter is about 4.8–5.5 microns.

9. A kaolin clay according to claim 1, further comprising a brightness no less than about 82.5%.

10. A pigment for coatings, said pigment comprising a kaolin clay having:
 an average Stokes equivalent particle diameter of about 4.5–6.0 microns; and
 a BET surface area of about 8–11 $m^2/g$.

11. A pigment according to claim 10, wherein said kaolin clay further comprises a median particle size of about 9.0–10.5 microns as determined by laser light scattering/Fraunhofer diffraction, and an average particle aspect ratio of about 12:1 to about 14:1 as determined by Sphericity Model calculation.

12. A pigment according to claim 11, wherein said kaolin clay has an anatase $TiO_2$ content of no greater than about 0.65 wt %.

13. A pigment according to claim 11, wherein said pigment has a brightness of no less than about 82.5%.

14. A resin composite comprising a resin and a kaolin clay, said kaolin clay comprising:
 an average Stokes equivalent particle diameter of about 4.5–6.0 microns; and
 a BET surface area of about 8–11 $m^2/g$.

15. A resin composite according to claim 14, wherein said kaolin clay further comprises a median particle size of about 9.0–10.5 microns as determined by laser light scattering/Fraunhofer diffraction, and an average particle aspect ratio of about 12:1 to about 14:1 as determined by Sphericity Model calculation.

16. A resin composite according to claim 15, wherein said resin is a thermoset polymer.

17. A resin composite according to claim 16, wherein said thermoset polymer is selected from the group consisting of an unsaturated polyester compound and an epoxy compound.

18. A resin composite according to claim 14, wherein said kaolin clay comprises about 10–150 phr of said composite.

19. A resin composite according to claim 14, wherein said kaolin clay comprises about 50–120 phr of said composite.

20. A resin composite according to claim 16, wherein said kaolin clay comprises about 10–150 phr of said composite.

21. A resin composite according to claim 16, wherein said kaolin clay comprises about 50–120 phr of said composite.

22. A resin composite according to claim 17, wherein said kaolin clay comprises about 10–150 phr of said composite.

23. A resin composite according to claim 17, wherein said kaolin clay comprises about 50–120 pbr of said composite.

24. A filler for a polymeric composition comprising a kaolin clay, said kaolin clay comprising:
 an average Stokes equivalent particle diameter of about 4.5–6.0 microns; and
 a BET surface area of about 8–11 $m^2/g$.

25. A filler according to claim 24, wherein said kaolin clay further comprises a median particle size of about 9.0–10.5 microns as determined by laser light scattering/Fraunhofer diffraction, and an average particle aspect ratio of about 12:1 to about 14:1 as determined by Sphericity Model calculation.

26. A filler according to claim 24, further comprising at least one inorganic material selected from the group consisting of alumina trihydrate, CaCO$_3$, talc, mica, glass, and another clay.

27. A filler according to claim 25, further comprising at least one inorganic material selected from the group consisting of alumina trihydrate, CaCO$_3$, talc, mica, glass, and another clay.

28. A filler according to claim 26, wherein said inorganic material is alumina trihydrate, and wherein the weight ratio of said kaolin clay to said alumina trihydrate is about 95/5 to about 50/50.

29. A filler according to claim 28, wherein said weight ratio is about 95/5 to about 70/30.

30. A filler according to claim 26, wherein said inorganic material is alumina trihydrate having a BET surface area of less than about 5 m$^2$/g.

31. A filler according to claim 30, wherein the weight ratio of said kaolin clay to said alumina trihydrate is about 95/5 to about 50/50.

32. A filler according to claim 31, wherein said weight ratio is about 95/5 to about 70/30.

33. A filler according to claim 32, wherein said alumina trihydrate has a BET surface area of less than about 3 m$^2$/g.

34. A method of producing the kaolin clay of claim 1 comprising the steps of:

blunging a crude kaolin clay to form a clay slurry;

degritting said clay slurry to form a partially-degritted clay;

centrifuging said partially-degritted clay to remove fine particle overflow and recover centrifuged coarse particle underflow;

centrifuging said centrifuged coarse particle underflow to remove additional fine particle overflow and recover twice-centrifuged coarse particle underflow;

centrifuging said twice-centrifuged coarse particle underflow to remove ultra-coarse underflow and recover thrice-centrifuged overflow clay;

subjecting said thrice-centrifuged overflow clay to a magnetic field to remove magnetic impurities;

screening said thrice-centrifuged overflow clay to remove ultra-coarse particles and grit;

leaching said thrice-centrifuged overflow clay to form a leached clay;

filtering said leached clay to form an acid filter cake clay;

drying said acid filter cake clay to form a dried clay;

milling said dried clay to form a finished kaolin clay product.

35. The method according to claim 34, wherein said crude kaolin clay is of Cretaceous origin.

36. The method according to claim 34, wherein particles less than 2 microns comprise about 62–78 wt % of said partially-degritted clay, as determined by x-ray Sedigraph measurement.

37. The method according to claim 34, wherein particles less than 2 microns comprise about 20–35 wt % of said centrifuged coarse particle underflow, as determined by x-ray Sedigraph measurement.

38. The method according to claim 34, wherein particles less than 2 microns comprise about 8–15 wt % of said twice-centrifuged coarse particle underflow, as determined by x-ray Sedigraph measurement.

39. The method according to claim 34, wherein said thrice-centrifuged overflow clay has a median particle size of about 9.5–11.5 microns as determined by laser light scattering/Fraunhofer diffraction measurement.

40. The method according to claim 34, wherein said finished kaolin clay product has a median particle size of about 9.0–10.5 microns as determined by laser light scattering/Fraunhofer diffraction measurement.

41. The method according to claim 34, wherein said magnetic field has a strength of at least 2 Tesla.

42. The method according to claim 34, wherein the finished kaolin clay product has a brightness of no less than about 82.5%.

43. The method according to claim 34, wherein said screening is performed using a screen no less fine than 325 mesh, such that said thrice-centrifuged overflow clay after said screening has a +325 mesh residue content of no greater than about 0.1 wt %.

44. The method according to claim 34, wherein said drying comprises redispersing said acid filter cake clay to form a clay slurry, then spray-drying said clay slurry.

* * * * *

UNITED STATES PATENT AND TRADEMARK OFFICE
CERTIFICATE OF CORRECTION

PATENT NO. : 5,846,309
DATED : December 8, 1998
INVENTOR(S) : Freeman, et al

It is certified that error appears in the above-identified patent and that said Letters Patent is hereby corrected as shown below:

In the Claims,

Claim 3, column 27, line 60, delete "for" prior to "comprising", and insert -- further -- therefor.
Claim 23, column 28, line 56, delete "pbr", and insert -- phr -- therefor.

Signed and Sealed this

Thirtieth Day of March, 1999

Attest:

Q. TODD DICKINSON

Attesting Officer

Acting Commissioner of Patents and Trademarks